May 8, 1923.

H. C. EVELYN

BOLT LOCKING DEVICE

Filed Jan. 6, 1922

1,454,271

Inventor,
Harry C. Evelyn,

Patented May 8, 1923.

1,454,271

UNITED STATES PATENT OFFICE.

HARRY C. EVELYN, OF CHICAGO, ILLINOIS.

BOLT-LOCKING DEVICE.

Application filed January 6, 1922. Serial No. 527,327.

*To all whom it may concern:*

Be it known that I, HARRY C. EVELYN, a citizen of the United States, and a resident of Chicago, in the county of Cook and State of Illinois, have invented certain new and useful Improvements in Bolt-Locking Devices, of which the following is a specification.

This invention relates to improvements in bolt locking devices and more particularly to an article of manufacture adapted to be used with bolts to prevent the same from rotating while a nut is being applied thereto and tightened against the member or parts through which the bolt passes.

It is a common experience among mechanics engaged in the assembly of machine parts and the like, to encounter difficulty in securing parts together, with bolts, for the reason that the shank of the bolt is free to turn in the hole, necessitating the use of two wrenches, one to engage the hexagonal head of the bolt and the other to tighten the nut. In numerous instances, the bolt is so placed that a wrench cannot be applied without great inconvenience, if at all, and frequently the services of another workman are required to perform the simple operation of keeping the bolt from turning. In automobile construction, conditions such as described are common and it follows that considerable time and labor might be saved by the use of a device designed to perform the simple yet vital operation of holding a bolt from rotation during the tightening of the nut.

An object of the present invention is to provide an inexpensive article of manufacture which will not only accomplish the desired result, but may be produced at low cost, enabling the same to be used freely wherever required.

A further object of the invention is to provide such an article so designed as to be applicable to bolts of various sizes such as would be encountered in the particular work being done.

A preferred form of the device is disclosed in the accompanying drawings in which.

Figure 1:
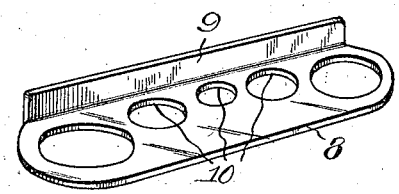
Fig. 1 is a perspective view of one of the devices.
Figure 4:
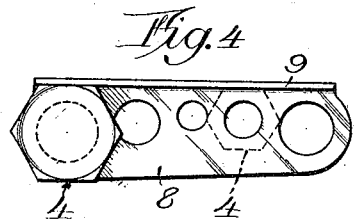
Fig. 4 is a view in elevation of a device showing the adaptability thereof to different sized bolts.
Figure 3:
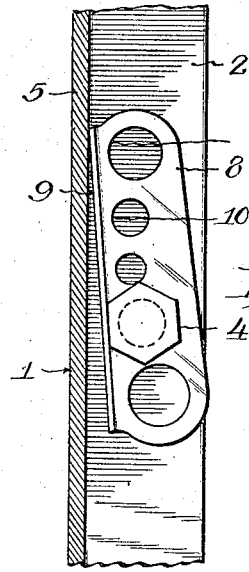
Fig. 3 is a view in longitudinal section on line 3—3 of Fig. 2 of the inner side of the bar, showing the action of the device.

As illustrative of a typical instance where the device is of utmost necessity let it be assumed that the channel bar 1 is the longitudinal frame member of an automobile chassis, with the horizontal flanges 2—2 extending inwardly. To this frame member a part 3 is bolted, such as fenders, splash pans, lamp brackets or the like, by means of bolts 4, passing through the flange 2 of the channel bar and the part to be secured thereto. The bolt is of the standard form, consisting of a threaded shank $4^a$ and a hexagonal head 6 at one end. To the end of the threaded shank is to be mounted a hexagonal nut 7, after the bolt is inserted through the parts to be secured together. Under the conditions indicated, a person may insert the bolt-shank foremost through the aligned bolt holes, from the inside of the channel bar, but owing to the shape of the bar and the presence of other obstructions it is impossible to reach the bolt head 6 with a wrench or other suitable tool. This, as before suggested, is frequently the case in actual practice and unless some means is employed for holding the bolt stationary, it will turn with the nut.

The device designed to overcome this annoyance and difficulty is an elongated strip or plate 8, preferably of thin metal of uniform width with rounded ends. Along one edge of the plate is a flange 9, bent at right angles thereto. This flange need not be of any particular width but only sufficient to provide an abutment to be engaged by one of the flat faces of the bolt head. Through the length of the plate are punched a plurality of holes 10 corresponding to the diameter of standard sized bolt shanks, as for instance ranging from ¼ inch to ½ inch, with intermediate sizes such as $\frac{5}{16}$ inch, ⅜ inch and $\frac{7}{16}$ inch. Furthermore these holes bear a definite relation to the flange 9, as to the radial distance from their centers thereto, this distance being equal to the radius of the bolt heads (measured to the flat faces) of the corresponding sized bolts.

Figure 2:
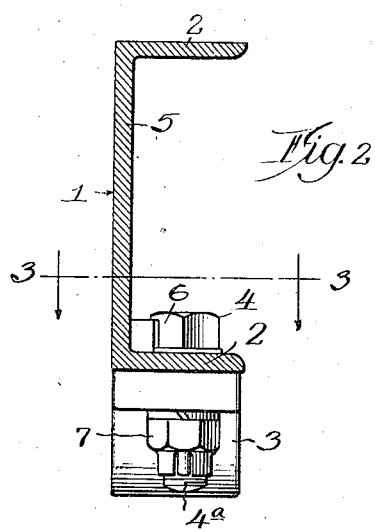
Fig. 2 is a view in cross section through an ordinary channel bar with a bolt therethrough having the article applied thereto.

The method of using the device is clearly disclosed in Figs. 1 and 2. The bolt is inserted through the proper sized bolt hole 10 in the plate with the flange 9, extending toward the head 6 of the bolt, and when the plate is brought in contact with the head, the flange bears flatwise against one face of the head thereby preventing the turning of the plate upon the bolt shank, with the plate applied to the bolt as described, said bolt is inserted through the bolt holes of the channel beam from the rear thereof, so that the threaded end will be readily accessible to receive the nut 4. Applying the nut in the usual manner will rotate the bolt, at least, when the nut begins to tighten, thus rotating the plate with it, until it strikes some projection or obstruction in its path, in this instance, the surface of the adjacent flange 2 of the channel beam. The plate being held from further rotation, manifestly prevents further movement of the bolt shank, due to the flatwise contact between flange and head with the result that the nut may be tightened without the least trouble. It is clear that in all instances the abutting engagement between flange and bolt head will not be affected at the time the device is applied to the bolt. This is not essential, however, for the slightest rotation coupled with a drawing up of the bolt will cause the abutting engagement to take place.

These locking plates manifestly remain in place, a plate being used on every inaccessible bolt to be tightened. However, this is the intention and hence the plates are made as light as possible, so as not to be objectionable because of their added weight and further the devices can be made very cheaply, so that the expense of providing them does not prevent them from being used freely.

Having described the device embodying the invention and the advantages derived from the use thereof, I claim:

1. An article of manufacture for the purpose described, comprising a plate having a plurality of holes of different sizes arranged lengthwise thereof, and adapted to fit bolts of corresponding sizes, and provided with a flange extending adjacent said holes, and positioned with respect thereto to form an abutment for the heads of said bolts.

2. An article of manufacture for the purpose described, comprising an elongated metallic plate having a marginal flange extending along one edge thereof, and a plurality of holes of selected sizes spaced from said flange at predetermined distances.

In witness whereof, I hereunto subscribe my name this 9th day of December, A. D., 1921.

HARRY C. EVELYN.